(12) United States Patent
Huang

(10) Patent No.: US 8,240,628 B2
(45) Date of Patent: Aug. 14, 2012

(54) HOLDING APPARATUS

(76) Inventor: Ming-Hsien Huang, Taipei County (TW)

( * ) Notice: Subject to any disclaimer, the term of this patent is extended or adjusted under 35 U.S.C. 154(b) by 53 days.

(21) Appl. No.: 12/905,160

(22) Filed: Oct. 15, 2010

(65) Prior Publication Data

US 2012/0025035 A1 Feb. 2, 2012

(30) Foreign Application Priority Data

Aug. 2, 2010 (TW) .............................. 99214746 U

(51) Int. Cl.
*A47G 1/00* (2006.01)

(52) U.S. Cl. ............... 248/316.1; 248/122.1; 248/176.1; 248/346.03; 248/917; 248/924

(58) Field of Classification Search ................. 248/924, 248/917, 918, 122.1, 124.2, 449, 346.07, 248/346.06, 176.3, 176.1, 689, 346.03, 316.1; 361/679.01

See application file for complete search history.

(56) References Cited

U.S. PATENT DOCUMENTS

| | | | | |
|---|---|---|---|---|
| 2,164,299 A | * | 6/1939 | Mandell et al. ................. | 40/741 |
| 5,457,745 A | * | 10/1995 | Wang ............................ | 379/454 |
| 5,982,885 A | * | 11/1999 | Ho ................................. | 379/446 |
| 6,504,710 B2 | * | 1/2003 | Sutton et al. ............. | 361/679.41 |
| 7,032,872 B2 | * | 4/2006 | Sullivan ................... | 248/346.07 |
| 7,611,112 B2 | * | 11/2009 | Lin .............................. | 248/274.1 |
| 7,918,427 B2 | * | 4/2011 | Wang ......................... | 248/278.1 |
| 7,967,269 B2 | * | 6/2011 | Liu ............................. | 248/287.1 |
| 8,027,464 B2 | * | 9/2011 | Piekarz ....................... | 379/455 |
| 2004/0099782 A1 | | 5/2004 | Schulz | |
| 2005/0236536 A1 | | 10/2005 | Fan | |
| 2010/0072334 A1 | * | 3/2010 | Le Gette et al. ........... | 248/176.3 |
| 2011/0170246 A1 | * | 7/2011 | Chu ......................... | 361/679.01 |
| 2011/0210830 A1 | * | 9/2011 | Talty et al. ................. | 340/10.51 |
| 2011/0290975 A1 | * | 12/2011 | Lin ........................... | 248/346.04 |

FOREIGN PATENT DOCUMENTS

| | | |
|---|---|---|
| DE | 19719512 A1 | 11/1998 |
| EP | 2386448 A1 | 11/2011 |

* cited by examiner

*Primary Examiner* — Amy J. Sterling

(74) *Attorney, Agent, or Firm* — Rosenberg, Klein & Lee

(57) ABSTRACT

A holding apparatus has a main body, a longitudinal clamping member, and second and third clamping members. The first clamping member is slidably disposed on the main body, and the first clamping member has at least one pair of slanted sliding-tracks. The transverse clamping members are slidably disposed on the main body each having at least one sliding element slidably coupled to the slanted sliding-track of the longitudinal clamping member.

16 Claims, 7 Drawing Sheets

HOLDING APPARATUS

BACKGROUND OF THE INVENTION

1. Field of the Invention

The present invention relates to a holding apparatus. In particular, the present invention relates to a holding apparatus having adjustable clamps that is adaptable to hold objects of different sizes.

2. Description of Related Art

With the advancement of modern information technology (IT), devices having display screens have become a norm of modern electronic design. Moreover, improvement in display screen technology facilitates the replacement of traditional heavy cathode ray tube (CRT) displays with light weight and small dimension liquid crystal displays (LCD), enabling the wide spread of mobile Electronics having information displaying screens.

The display screens may be configured to effectively present visual data to users; the addition of touch panels further improve the market value of the display screens. Users can directly point the screen to input his/her commands to control the devices.

Although the miniature size of modern electronic devices may enhance the portability and operational flexibility, there are still occasions preferably require the portable devices being mounted for ease of operation, for example, mounting a mobile phone on a support unit on the dash board in a car while driving. However, mobile electronic devices come in various sizes and shapes. It is practically challenging to provide a support unit capable of being "one holder fits all." Most traditional holding stands are designed specifically to fit certain type and make of electronic devices, therefore have somewhat restricted adaptability, only suitable for one kind of product; in other words, the traditional stand can not be used to hold the various products due to the size variation. Currently, user emplaces the mobile device on the traditional stand so that he/she can watch the display screen or control the device by hands.

The instant disclosure provides an adaptable holding apparatus to address this problem.

SUMMARY OF THE INVENTION

One particular aspect of the present invention is to provide a holding apparatus having movable and slidable clamping members adaptable for holding objects of various dimensions. The holding apparatus is particularly suitable for holding the objects of different sizes, such as various portable electronic devices.

The holding apparatus comprises a main body, a longitudinal clamping member, and second and third clamping members. The main body has a longitudinal positioning pillar and a pair of transverse positioning pillars. The first clamping member has a first guiding-groove and at least a pair of slanted sliding-tracks slidably disposed on and longitudinally slidable with respect to the main body. The first guiding-groove of the first clamping member corresponds to the longitudinal positioning pillar of the main body, and the pair of slanted sliding-tracks are arranged substantially symmetrically about the longitudinal axis of the longitudinal clamping member. The pair of transverse clamping members are substantially symmetrical to each other and slidably disposed on the lateral sides of the main body. Each transverse clamping member has a transverse sliding-track and at least one sliding element. The transverse sliding-track of each transverse clamping member respectively corresponds to the transverse positioning pillars of the main body, and the at least one sliding element of each transverse clamping member is slidably coupled to the slanted sliding-track of the longitudinal clamping member.

The slanted tracks on the first clamping member are arranged in such a way that when the transverse clamping members slide toward each other, the sliding members thereof causing the first clamping member to slide downward or upward with respect to the main body.

Another aspect of the present invention is to provide a holding apparatus which can be assembled with different stands, such as base, suction disks, suspension arms or frames so as to improve the application of the holding apparatus.

The present invention has the following characteristics. By sliding the longitudinal clamping member, the second clamping member and the third clamping member are simultaneously driven to move in reversed directions (i.e., toward or away from each other). Therefore, the holding apparatus can be used to hold devices with different dimensions.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

The present invention provides a holding apparatus that is used to hold an object, such as electronic products, including mobile communication devices or electronic books. The holding apparatus is adjustable so that it can be applied to devices of different volumes and sizes.

Figure 1A:
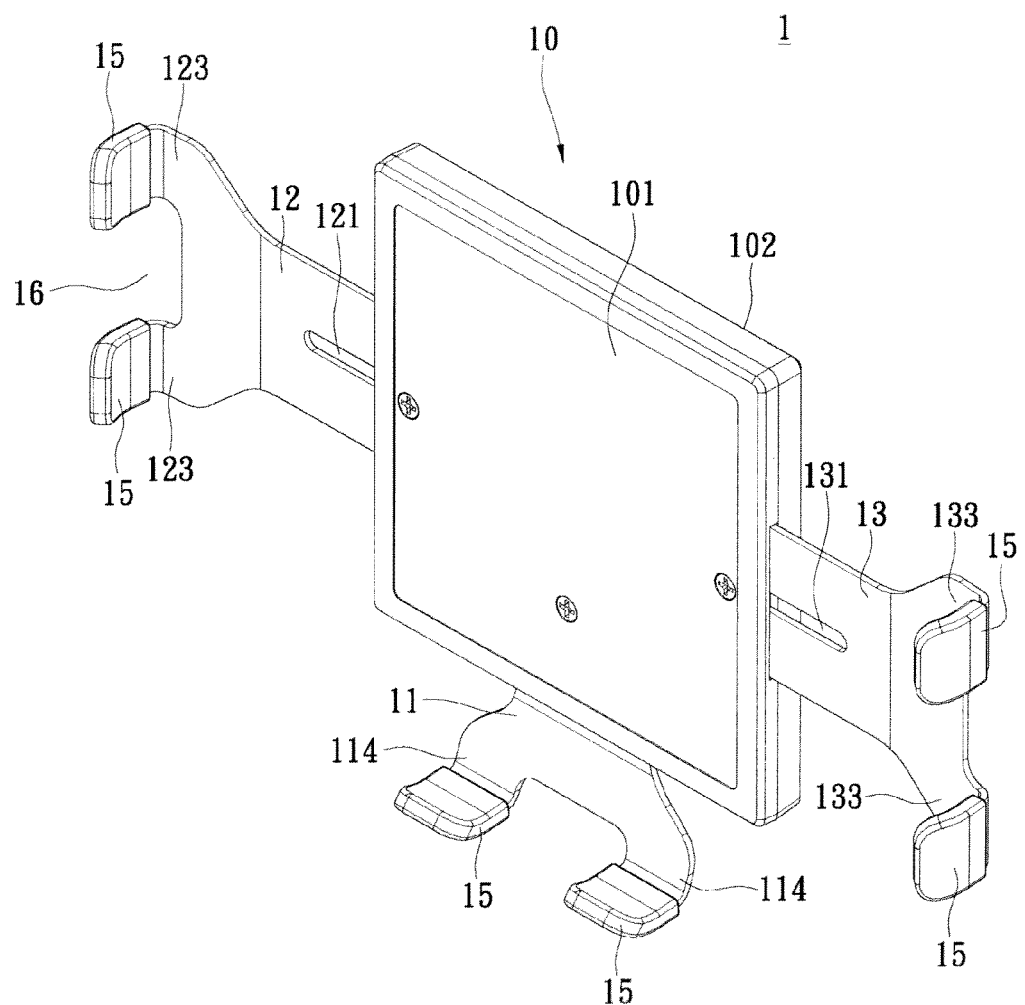
FIG. 1A is a perspective view of the holding apparatus of the present invention.
Figure 1B:
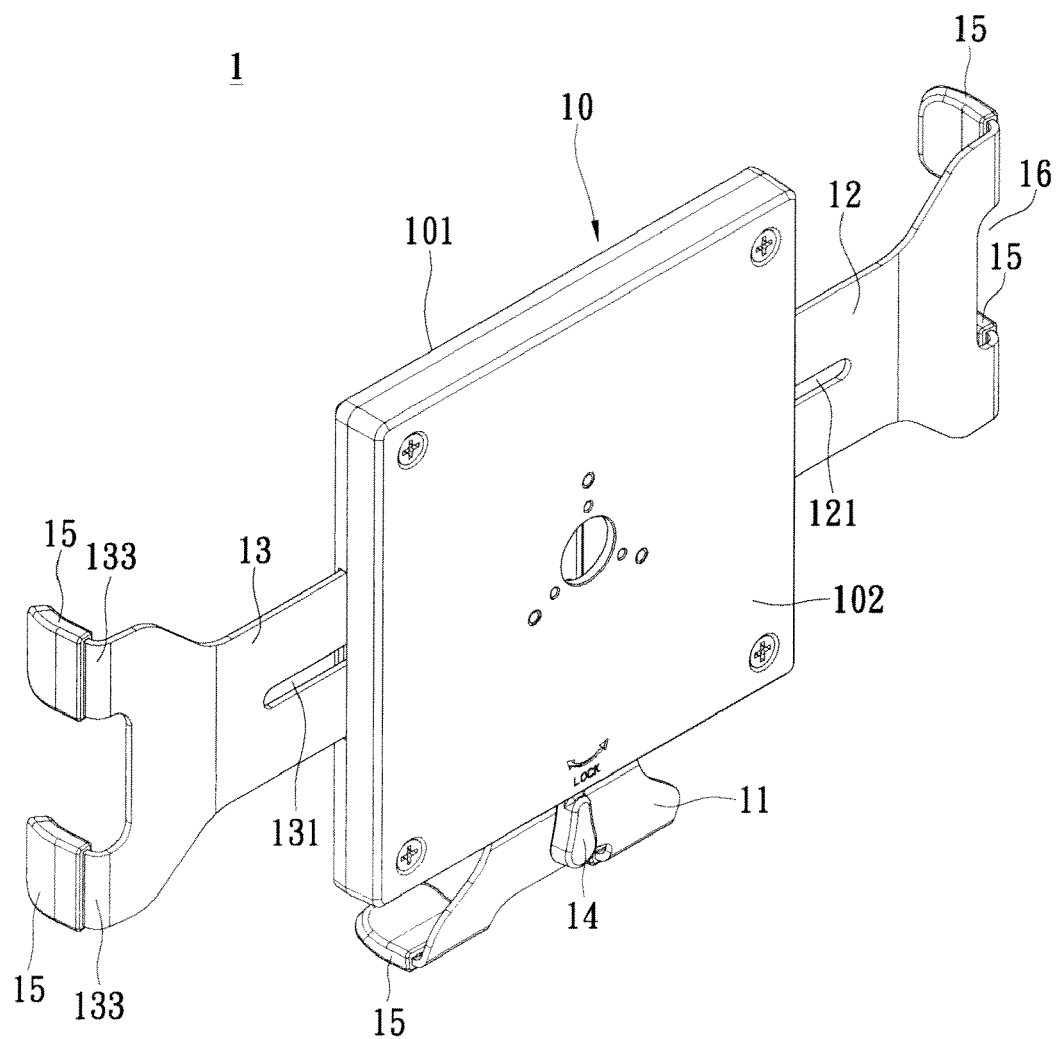
FIG. 1B is another perspective view of the holding apparatus of the present invention.
Figure 2A:
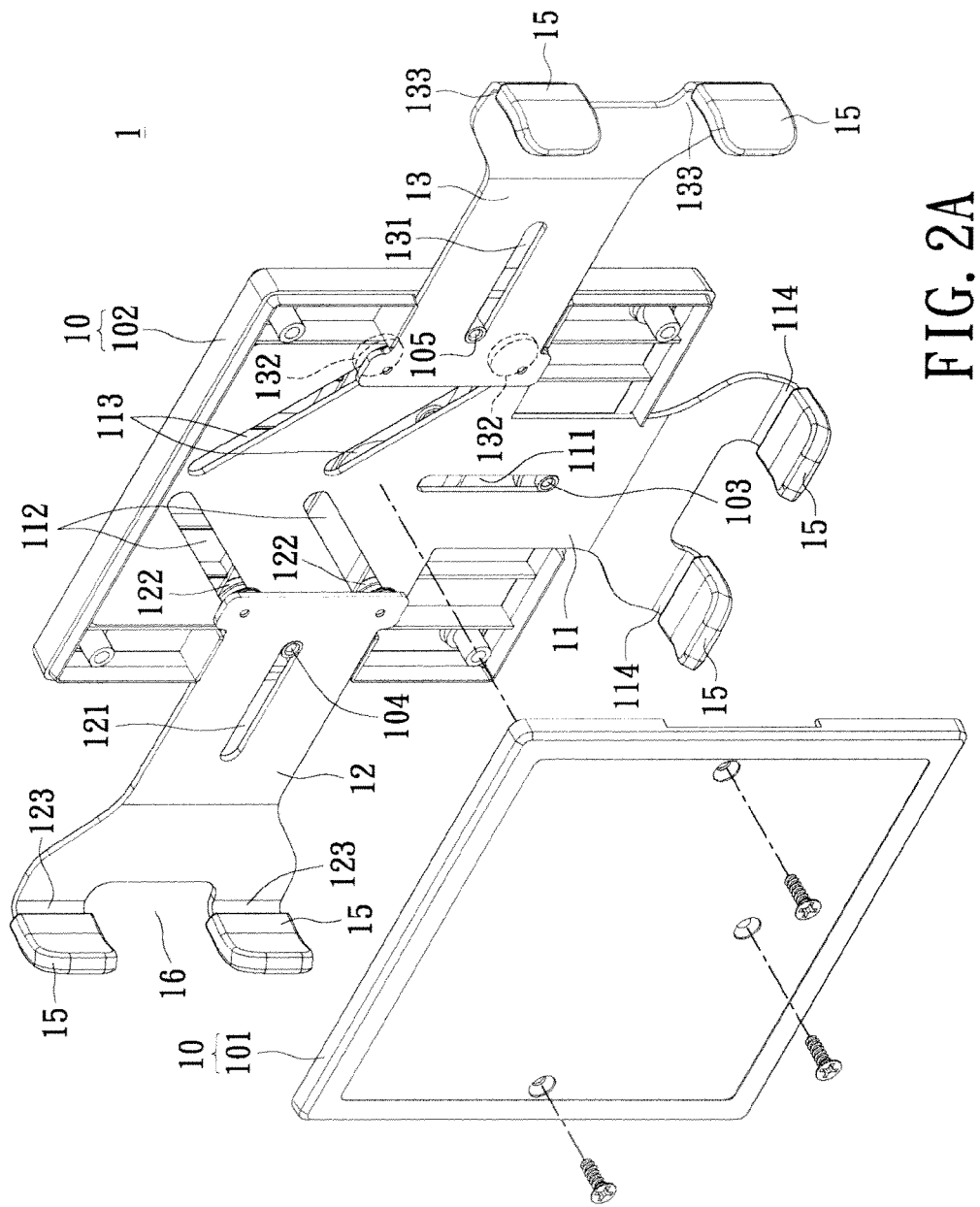
FIG. 2A is an exploded perspective view of the holding apparatus of the present invention when no object clamped thereon.

Reference is made to FIGS. 1A and 1B. The holding apparatus 1 comprises a main body 10, a first clamping member 11, second and third clamping members 12 and 13. The main body 10 may be a casing constructed by a front cover 101 and a rear cover 102, and the main body 10 has a receiving room formed between the front cover 101 and the rear cover 102. The first clamping member 11 and the second and the third clamping members 12, 13 are accommodated in the receiving room of the main body 10 and extend out of the main body 10. In one embodiment, such as shown in FIG. 2A, the main body 10 has a first positioning pillar 103, a second positioning pillar 104 and a third positioning pillar 105 thereinside. The positioning pillars 103, 104, 105 are used to limit the sliding length of the clamping members 11, 12, 13 and to provide supporting strength for the clamping members 11, 12, 13.

Figure 2B:
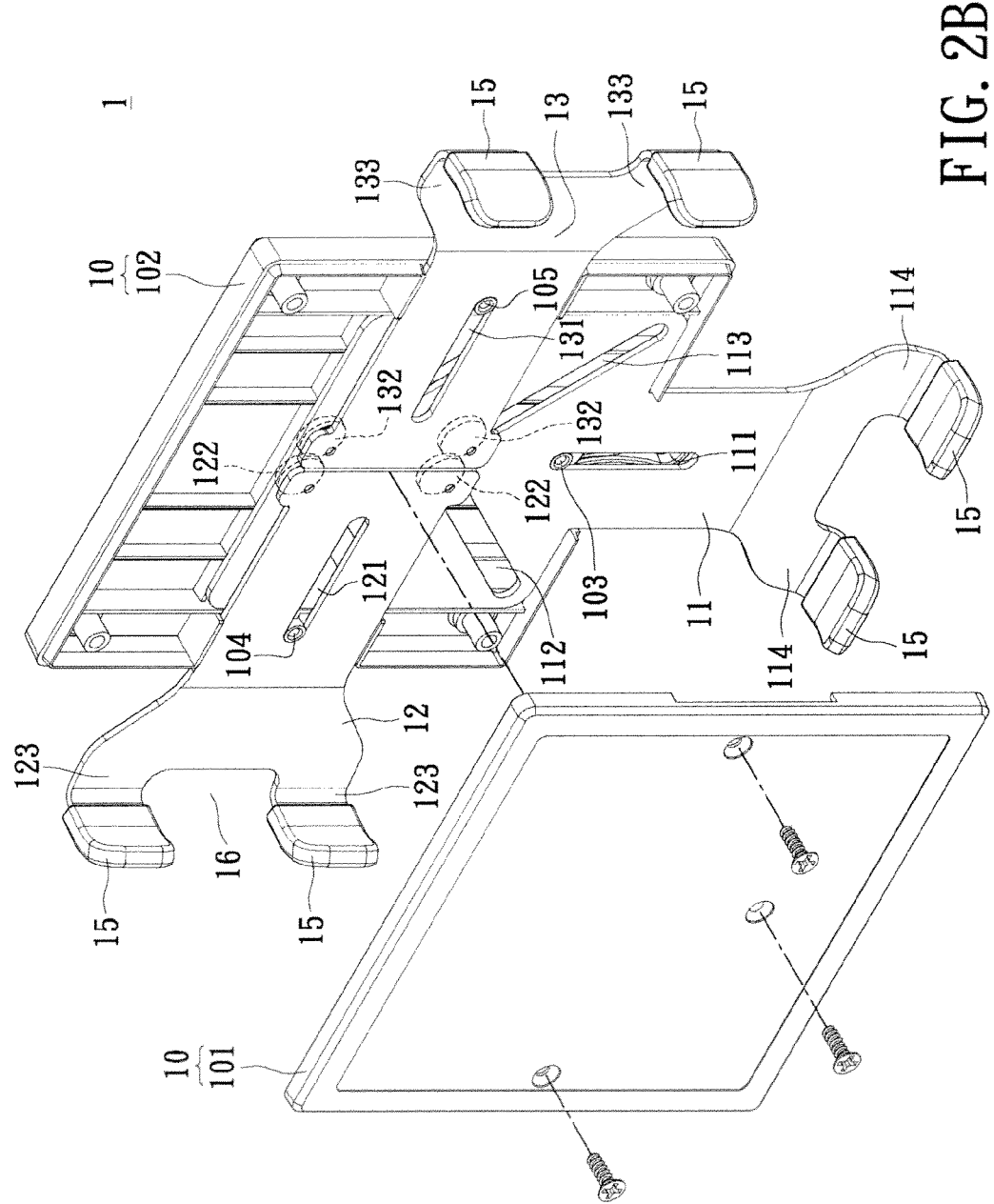
FIG. 2B is an exploded perspective view of the holding apparatus of the present invention when an object clamped thereon.

Please refer to FIGS. 2A and 2B; the first clamping member 11 is movably assembled on the main body 10. In the instant embodiment, the first clamping member 11 has a first guiding-groove 111 corresponding to the first positioning pillar 103. The first clamping member 11 can slide in the longitudinal direction by the first guiding-groove 111 and the first positioning pillar 103. For example, when the first positioning pillar 103 abuts against the lower end of the first guiding-groove 111, the first clamping member 11 is located at a first position, i.e., an upper position, as shown in FIG. 2A. Alternatively, when the first positioning pillar 103 abuts against the upper end of the first guiding-groove 111, the first clamping member 11 is located at a second position, i.e., a lower position, as shown in FIG. 2B. However, the invention is not restricted by the usage of pillar and track; the similar slidable means can be used for sliding the first clamping member 11 between the first and the second positions.

Figure 1C:
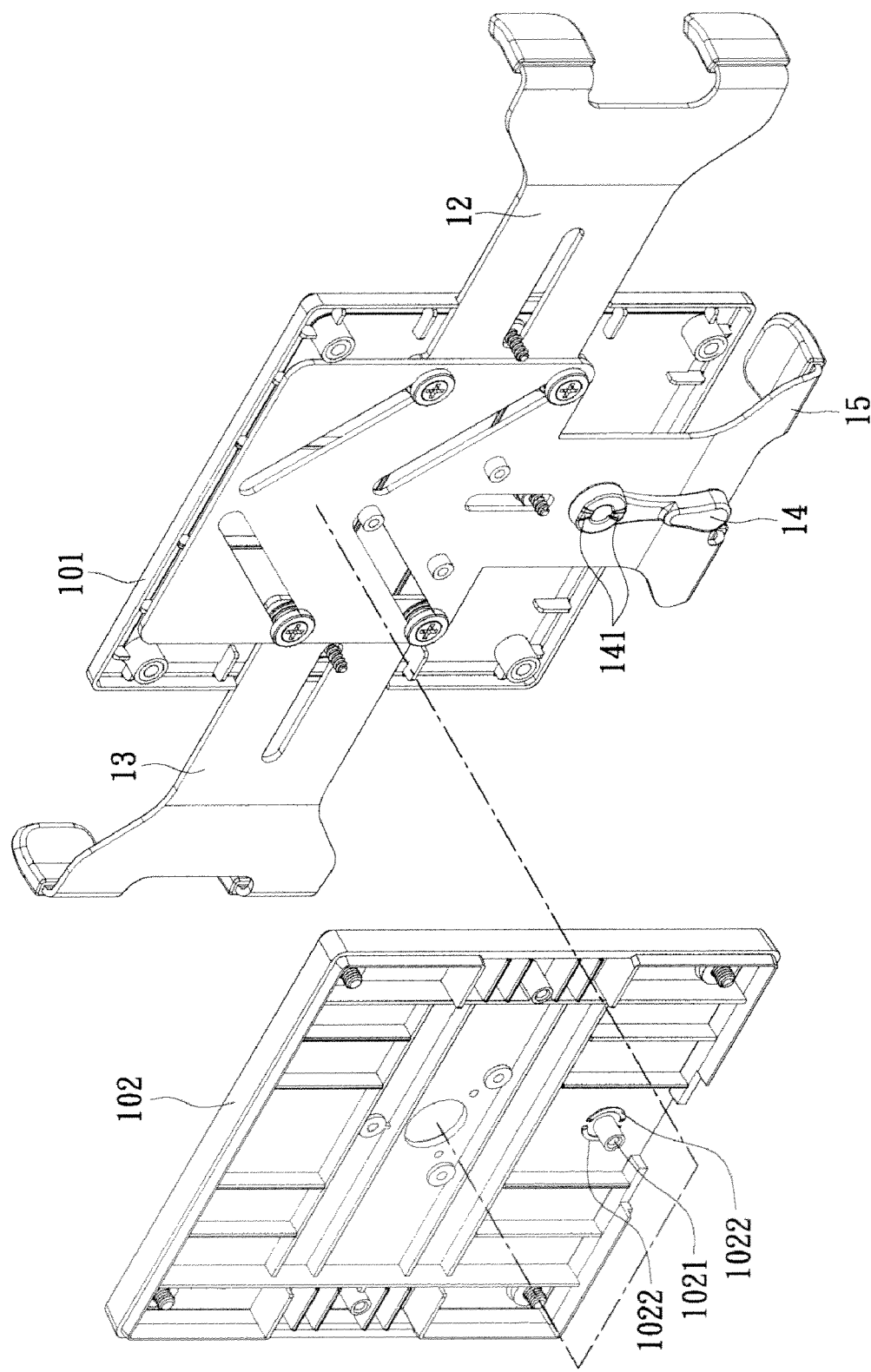
FIG. 1C is an exploded perspective view of FIG. 1B.

Furthermore, the first clamping member 11 has at least one pair of slanted sliding-track 112 and 113. In the present embodiment, the first slanted sliding-track 112 and the second slanted sliding-track 113 are used to simultaneously drive the second clamping member 12 and the third clamping member 13 when the first clamping member 11 slides between the first and the second positions. In the instant embodiment, the first slanted sliding-track 112 and the second slanted sliding-track 113 are arranged as an inverted "V" shape, but the two slanted sliding-tracks 112, 113 are not connected to each other. As shown in FIG. 1C, the first clamping member 11 has two first slanted sliding-tracks 112 and two second slanted sliding-tracks 113 thereon.

The second clamping member 12 is movably assembled on the main body 10. In the instant embodiment, the second clamping member 12 has a second guiding-groove 121 corresponding to the second positioning pillar 104. Therefore, the second clamping member 12 can slide in the transversal direction by the second guiding-groove 121 and the second positioning pillar 104. On the other hand, the second clamping member 12 has at least one first sliding element 122 slidably connected to the first slanted sliding-track 112. In the embodiment, the second clamping member 12 has two first sliding elements 122 which respectively connected to the first slanted sliding-tracks 112 of the first clamping member 11.

Similar with the second clamping member 12, the third clamping member 13 is movably assembled on the main body 10. In the instant embodiment, the third clamping member 13 has a third guiding-groove 131 corresponding to the third positioning pillar 105. Therefore, the third clamping member 13 can slide in the transversal direction by the third guiding-groove 131 and the third positioning pillar 105. On the other hand, the third clamping member 13 has at least one second sliding element 132 slidably connected to the second slanted sliding-track 113. In the embodiment, the third clamping member 13 has two second sliding elements 132 which respectively connected to the second slanted sliding-tracks 113 of the first clamping member 11.

Please refer to FIG. 2A; while the first clamping member 11 is shown on the first position, the second clamping member 12 and the third clamping member 13 are away from each other for forming a releasing position. As shown in FIG. 2B, when an object is put on the holding apparatus 1, the first clamping member 11 slides downward due to the weight of the object and then achieves the second position. While the first clamping member 11 is sliding downward, the second clamping member 12 and the third clamping member 13 simultaneously move toward each other because of the coordination of the first sliding element 122 and the first slanted sliding-track 112, and the coordination of the second sliding element 132 and the second slanted sliding-track 113. In other words, the second clamping member 12 and the third clamping member 13 moves toward the main body 10 so that the transversal clamping members 12, 13 are located at a clamping position for clamping the inserted object. The width between the transversal clamping members 12, 13 at the clamping position is adjusted depending on the width of the inserted object.

On the other hand, when a user wants to take the object away from the holding apparatus, the user can force on the first clamping member 11 at the second position so that the first clamping member 11 slides upward. While the first clamping member 11 is sliding upward, the second clamping member 12 and the third clamping member 13 simultaneously move away from each other because of the coordination of the first sliding element 122 and the first slanted sliding-track 112, and the coordination of the second sliding element 132 and the second slanted sliding-track 113. In other words, the second clamping member 12 and the third clamping member 13 moves outward the main body 10 so that the transversal clamping members 12, 13 move back to the release position for releasing the inserted object.

Therefore, the holding apparatus 1 of the present invention is applied to objects with different sizes. In the instant embodiment, when an object is put on the holding apparatus 1, the first clamping member 11 slides downward and the transversal clamping members 12, 13 move respectively rightward and leftward so as to clamp the object. Alternatively, by forcing on the first clamping member 11 of the holding apparatus 1, the first clamping member 11 slides upward and the transversal clamping members 12, 13 move respectively leftward and rightward so as to release the object.

Moreover, the holding apparatus 1 further has a switch 14 (i.e., safety mechanism) disposed on the main body 10 and the switch 14 can be pulled so as to fix or release the movement of the first clamping member 11. In the instant embodiment, the switch 14 is pivoted on the main body 10. The main body 10 has a plurality of convex ribs 1022, and the switch 14 has protrusions 141 corresponding to the convex ribs 1022. For example, the switch 14 is rotatably pivoted on the pivoting pillar 1021 on the rear cover 102. The convex ribs 1022 of the rear cover 102 are formed and located at two sides of the pivoting pillar 1021. The protrusions 141 of the switch 14 preferably have slanted surfaces. When an object is clamped by the first clamping member 11 and the second and third clamping members 12, 13, the switch 14 is pulled so that the protrusions 141 of the switch 14 are climbing on the convex ribs 1022 along the slanted surfaces. Thus, the thickness of the protrusions 141 and the convex ribs 1022 are used to limit the movement of the first clamping member 11. In other words, the position of the object can be fixed because the position of the first clamping member 11 is limited by pulling the switch 14. Alternatively, the switch 14 can be released so that the protrusions 141 and the convex ribs 1022 are arranged in a un-function position (i.e., the protrusions 141 are not positioned on the convex ribs 1022). Meanwhile, the first clamping member 11 can freely slide downward or upward. In practice, user can pull the switch 14 to lock the position of the first clamping member 11 (also the position of the inserted object). After releasing the switch 14, the first clamping member 11 can freely slide upward by force so that the user can take the object away from the holding apparatus 1.

For improving the clamping or holding effect, the end of the first clamping member 11 can be formed as a clamping portion 114, and/or the end of the second clamping member 12 can be formed as a clamping portion 123, and/or the end of the second transversal clamping member 13 can be formed as a clamping portion 133. In other words, the ends of first clamping member 11, the second clamping member 12 and the third clamping member 13 are respectively or selectively formed as a clamping portion. In the embodiment, the clamping portion 114, 123, 133 can have a plurality of bent arms for clamping the object with enhanced strength. Furthermore, a protection piece 15 is disposed on the bent arms, for example, the bent arms are covered with elastic sheaths of silicon material for preventing the object from scratch.

Furthermore, for applying the connector to the object clamped on the holding apparatus 1, such as power-supply connector, data-transmission connector, or electrical cards, at least one of the ends of the clamping members 11, 12, 13 has terminal insertion portion. In the embodiment, the end of the second clamping member 12 has a slot 16 formed between the two bent arms to expose the connection socket of the electronic object so that the external connector can be contact the connection socket of the electronic object. However, the position, shape, or amounts of the slot 16 are not restricted thereby.

Figure 3A:
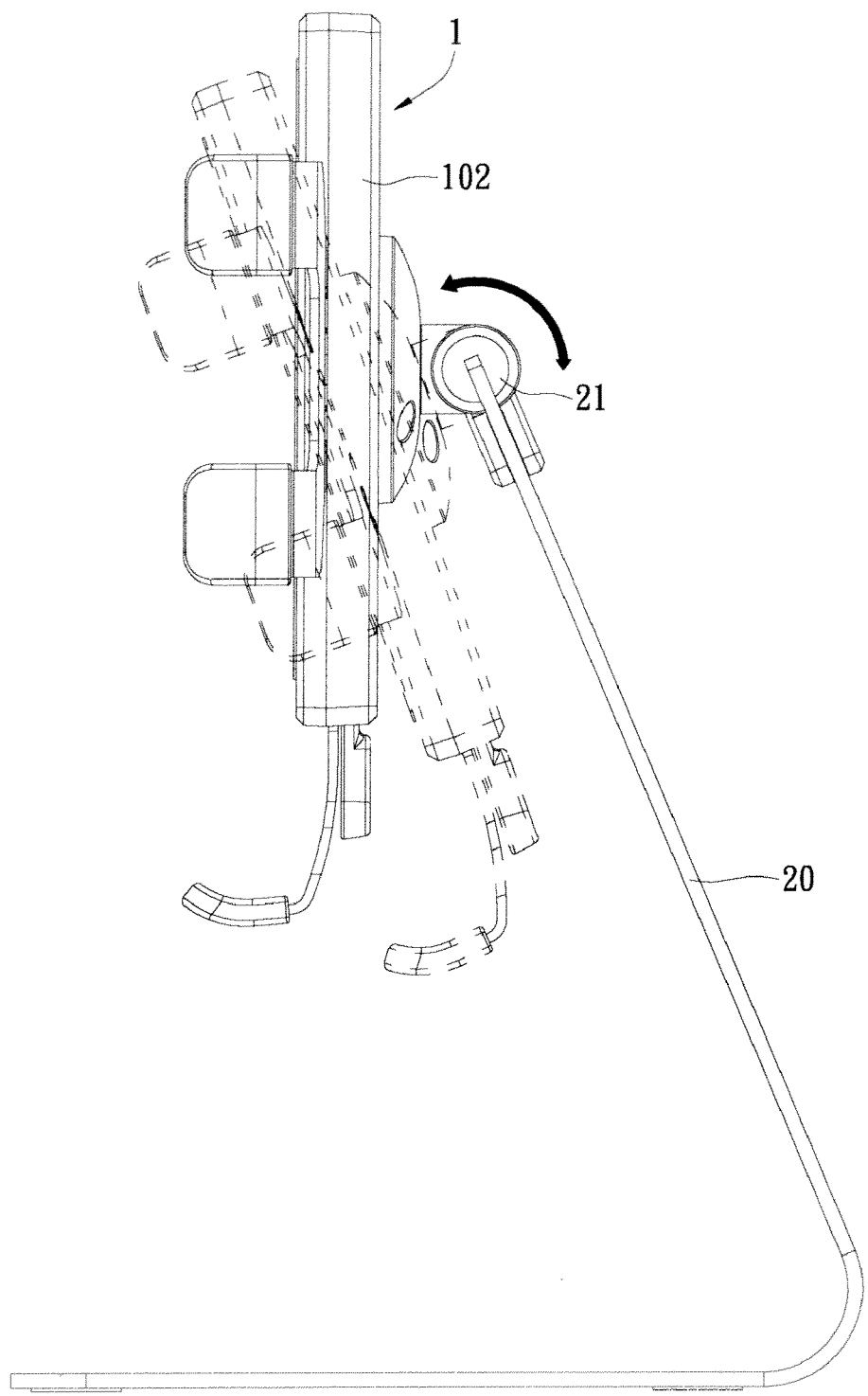
FIG. 3A is a perspective view of the holding apparatus assembled on a supporting base and the angle adjustment of the holding apparatus in one axis.
Figure 3B:
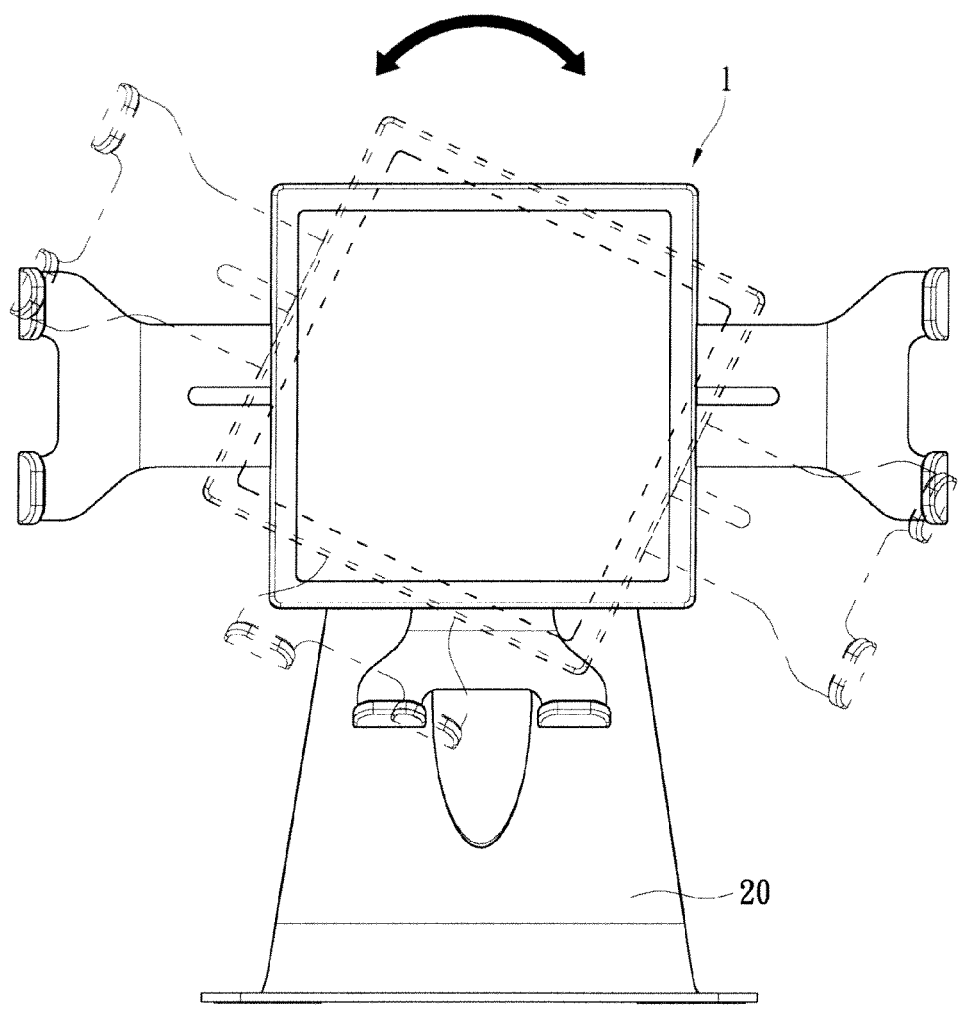
FIG. 3B is a perspective view of the holding apparatus assembled on a supporting base and the angle adjustment of the holding apparatus in another axis.

Reference is made to FIGS. 3A, 3B; the holding apparatus 1 of the present invention can be coupled to a supporting base 20. In the embodiment, the supporting base 20 is assembled with the main body 10, for example, the rear cover 102 of the main body 10. Moreover, a pivoting member 21 may be connected between the main body 10 and the supporting base 20. Thus, the object clamped on the holding apparatus 1 can be adjusted in multi directions, for example, the display screen of a clamped electronic device can be adjusted to a comfortable view state for the user (adjustment in two axes are shown in FIGS. 3A, 3B). Please note that the supporting base 20 illustrated in FIGS. 3A, 3B is an extemporary base, and the supporting base 20 may be a supporting stand, a base with suction disks, a base of suspension arms, or a supporting frame.

The present invention has the following characteristics.

1. The holding apparatus utilizes the movement of the first clamping member to simultaneously drive the relative slides of the second clamping member and the third clamping member. Thus, the three clamping members can be used to clamp and hold devices of different sizes.

2. The holding apparatus can be assembled with different stands so as to be used in various applications for clamping and holding objects. Particularly, it is convenient for users to watch or reading the electronic devices.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A holding apparatus, comprising:
a main body having a geometric center;
a first clamping member movably and partially disposed in the main body, the first clamping member having a first transmission end and a first clamping end extending out of the main body;
a second clamping member movably and partially disposed in the main body, the second clamping member having a second transmission end and a second clamping end extending out of the main body;
a third clamping member movably and partially disposed in the main body, the third clamping member having a third transmission end and a third clamping end extending out of the main body; and
a pair of transmission assembly disposed in the main body, one of the pair of the transmission assembly connected between the first transmission end of the first clamping member and the second transmission end of the second clamping member, the other of the transmission assembly connected between the first transmission end of the first clamping member and the third transmission end of the third clamping member;
wherein each of the pair of transmission assembly includes at least one transmission member and at least one sliding-track, the at least one sliding-track is slantedly formed on the first transmission end of the first clamping member with respect to the first direction, the second and the third transmission end each has the transmission member slidably coupled to the sliding-track,
wherein when one of the first, second and third clamping members sides, the pair of transmission assembly are driven so as to drive the remaining of the first, second and third clamping members side;
wherein when the distance between the first clamping end and the geometric center is minimum, the distance between the second clamping end and the geometric center is maximum and the distance between the third clamping end and the geometric center is maximum;
wherein when the distance between the first clamping end and the geometric center is maximum, the distance between the second clamping end and the geometric center is minimum and the distance between the third clamping end and the geometric center is minimum.

2. The holding apparatus of claim 1, wherein the pair of transmission assembly each has at least one guiding surface, the first clamping member slides reciprocatedly along the guiding surface in the first direction, the second and the third clamping members slide reciprocatedly along the guiding surface in the second direction, and the first direction is substantially perpendicular to the second direction.

3. The holding apparatus of claim 1, wherein the main body further has a first positioning pillar, a second positioning pillar and a third positioning pillar, the first clamping member has a first guiding-groove substantially parallel to the first direction, the second clamping member has a second guiding-groove substantially parallel to the second direction, the third clamping member has a third guiding-groove substantially parallel to the second direction, the first, second and third positioning pillars are respectively slidably coupled to the first, second and third guiding-grooves.

4. The holding apparatus of claim 2, wherein the first, second and third transmission ends are accommodated in the main body.

5. The holding apparatus of claim 2, wherein the first, second and third clamping ends each has a plurality of bent arms.

6. The holding apparatus of claim 2, wherein at least one of the end of the first clamping member, the end of the second clamping member and the end of the third clamping member has a slot thereon.

7. The holding apparatus of claim 2, further comprising a pivoting member and a support base, wherein the pivoting member is connected between the support base and the main body, the main body is rotatable with respect to the support base.

8. A holding apparatus, comprising:
a main body having a geometric center;
a retaining switch pivoted on the main body, wherein main body has at least one convex rib, the retaining switch has at least one protrusion corresponding to the convex rib;
a first clamping member movably and partially disposed in the main body, the first clamping member having a first transmission end and a first clamping end extending out of the main body,
wherein when the retaining switch rotates, the protrusion moves to abut against the convex rib so as to fix the first clamping member at a predetermined position;
a second clamping member movably and partially disposed in the main body, the second clamping member having a second transmission end and a second clamping end extending out of the main body;
a third clamping member movably and partially disposed in the main body, the third clamping member having a third transmission end and a third clamping end extending out of the main body; and
a pair of transmission assembly disposed in the main body, one of the pair of the transmission assembly connected between the first transmission end of the first clamping member and the second transmission end of the second clamping member, the other of the transmission assembly connected between the first transmission end of the first clamping member and the third transmission end of the third clamping member;
wherein when one of the first, second and third clamping members sides, the pair of transmission assembly are driven so as to drive the remaining of the first, second and third clamping members side;
wherein when the distance between the first clamping end and the geometric center is minimum, the distance between the second clamping end and the geometric center is maximum and the distance between the third clamping end and the geometric center is maximum;
wherein when the distance between the first clamping end and the geometric center is maximum, the distance between the second clamping end and the geometric center is minimum and the distance between the third clamping end and the geometric center is minimum.

9. A holding apparatus, comprising:
a main body having a geometric center;
a first clamping member movably and partially disposed in the main body, the first clamping member having a first transmission end and a first clamping end extending out of the main body;
a second clamping member movably and partially disposed in the main body, the second clamping member having a second transmission end and a second clamping end extending out of the main body;
a third clamping member movably and partially disposed in the main body, the third clamping member having a third transmission end and a third clamping end extending out of the main body; and
a pair of transmission assembly disposed in the main body, one of the pair of the transmission assembly connected between the first transmission end of the first clamping member and the second transmission end of the second clamping member, the other of the transmission assembly connected between the first transmission end of the first clamping member and the third transmission end of the third clamping member;
wherein each of the pair of transmission assembly includes at least one transmission member and at least one sliding-track, the at least one sliding-track is slantedly formed on the first transmission end of the first clamping member with respect to the first direction, the second and the third transmission end each has the transmission member slidably coupled to the sliding-track,
wherein when one of the first, second and third clamping members sides, the pair of transmission assembly are driven so as to drive the remaining of the first, second and third clamping members side;
wherein when the distance between the first clamping end and the geometric center is minimum, the distance between the second clamping end and the geometric center is minimum and the distance between the third clamping end and the geometric center is minimum;
wherein when the distance between the first clamping end and the geometric center is maximum, the distance between the second clamping end and the geometric center is maximum and the distance between the third clamping end and the geometric center is maximum.

10. The holding apparatus of claim 9, wherein the pair of transmission assembly each has at least one guiding surface, the first clamping member slides reciprocatedly along the guiding surface in the first direction, the second and the third clamping members slide reciprocatedly along the guiding surface in the second direction, and the first direction is substantially perpendicular to the second direction.

11. The holding apparatus of claim 10, wherein the main body further has a first positioning pillar, a second positioning pillar and a third positioning pillar, the first clamping member has a first guiding-groove substantially parallel to the first direction, the second clamping member has a second guiding-groove substantially parallel to the second direction, the third clamping member has a third guiding-groove substantially parallel to the second direction, the first, second and third positioning pillars are respectively slidably coupled to the first, second and third guiding-grooves.

12. The holding apparatus of claim 10, wherein the first, second and third transmission ends are accommodated in the main body.

13. The holding apparatus of claim 10, wherein the first, second and third clamping ends each has a plurality of bent arms.

14. The holding apparatus of claim 10, further comprising a retaining switch pivoted on the main body, wherein main body has at least one convex rib, the retaining switch has at least one protrusion corresponding to the convex rib, when the retaining switch rotates, the protrusion moves to abut against the convex rib so as to fix the first clamping member at a predetermined position.

15. The holding apparatus of claim 10, wherein at least one of the end of the first clamping member, the end of the second clamping member and the end of the third clamping member has a slot thereon.

16. The holding apparatus of claim 10, further comprising a pivoting member and a support base, wherein the pivoting member is connected between the support base and the main body, the main body is rotatable with respect to the support base.

* * * * *